United States Patent [19]

Fisher et al.

[11] Patent Number: 5,102,645
[45] Date of Patent: Apr. 7, 1992

[54] METHOD FOR MANUFACTURE OF HIGH PURITY CARBON MONOXIDE

[75] Inventors: Daniel E. Fisher, Baton Rouge, La.; Bobby M. Tindall; Raju S. Natarajan, both of Tyler, Tex.

[73] Assignees: Liquid Carbonic Corporation, Chicago, Ill.; Howe-Baker Engineers, Inc., Tyler, Tex.

[21] Appl. No.: 662,916

[22] Filed: Feb. 28, 1991

Related U.S. Application Data

[63] Continuation-in-part of Ser. No. 541,847, Jun. 21, 1990, abandoned.

[51] Int. Cl.$^5$ ............................................. C01B 31/18
[52] U.S. Cl. ............................... 423/415 A; 423/650
[58] Field of Search ........................... 423/415 A, 650

[56] References Cited

FOREIGN PATENT DOCUMENTS

| | | | |
|---|---|---|---|
| 2711991 | 9/1978 | Fed. Rep. of Germany | 423/415 A |
| 331648 | 2/1979 | U.S.S.R. | 423/650 |
| 2187751 | 9/1987 | United Kingdom | 423/650 |

*Primary Examiner*—Michael Lewis
*Assistant Examiner*—Stuart L. Hendrickson
*Attorney, Agent, or Firm*—Fitch, Even, Tabin & Flannery

[57] ABSTRACT

The present invention is directed to a method for producing high purity carbon monoxide. In the method, a hydrocarbon feed stock and import carbon dioxide are introduced into a reaction system containing a primary reformer and a secondary reformer. The hydrocarbon feed stock, import carbon monoxide and recycle carbon monoxide are passed through the primary reformer while being heated to a temperature sufficient to reform the feed stock into a first carbon monoxide reaction product. The first reaction product and oxygen are fed into the secondary reformer. The first reaction product is reacted in the secondary reformer in an autothermal reaction to provide a second carbon monoxide reaction product having a lower hydrocarbon level than the first reaction product. The second reaction product is removed from the secondary reformer at a second predetermined temperature and a high purity carbon monoxide is recovered from the second reaction product without the use of cryogenic separation techniques.

11 Claims, No Drawings

METHOD FOR MANUFACTURE OF HIGH PURITY CARBON MONOXIDE

CROSS REFERENCE TO RELATED APPLICATION

This is a continuation-in-part of application Ser. No. 541,847 filed June 21, 1990 now abandoned.

FIELD OF THE INVENTION

The present invention is directed to a method for producing high purity carbon monoxide from hydrocarbons without the need for cryogenic processing. More particularly, the present invention is directed to a method for converting hydrocarbons into hydrogen and high purity carbon monoxide in a primary reformer and then converting residual hydrocarbon remaining in the product from the primary reformer in a secondary oxygen reformer through the use of high levels of import carbon dioxide and subsequent membrane separation.

BACKGROUND OF THE INVENTION

It is well known to produce carbon monoxide by a steam reforming process in which a hydrocarbon feed stock, such as natural gas, refinery gas, liquefied gas or naphtha, is treated with water vapor at elevated temperatures in contact with a catalyst and is thus converted to a gas which is rich in hydrogen and carbon monoxide. When the product gas has been cooled down, the carbon dioxide and water vapor still contained therein are removed by scrubbing with a suitable material and the gas is separated into carbon monoxide and hydrogen components at low temperature.

It is also known to improve the yield of carbon monoxide by recycling the carbon dioxide which has been scrubbed from the primary reformer product, back to the primary reformer, see for example, U.S. Pat. No. 3,988,425 to Jockel. The product obtained after removal of the carbon dioxide is often referred to as "synthesis gas" since mixtures of carbon monoxide and hydrogen are useful in synthesizing organic compounds. Methods for producing synthesis gas are described in U.S. Pat. No. 2,198,553 to Roberts, U.S. Pat. No. 2,485,875 to Gorin, et al., U.S. Pat. No. 2,496,342 to Gillespie, U.S. Pat. No. 4,175,115 to Ball, et al. and U.S. Pat. No. 4,316,880 to Jockel.

For many industrial processes, a high purity source of carbon monoxide is required. In most known synthesis gas production processes, however, a reaction product is obtained from a primary or secondary reformer which has a relatively high level of methane, which is the usual residual hydrocarbon contaminant. The usual method for the production of high purity carbon monoxide involves the use of cryogenic distillation wherein the carbon monoxide and methane are cryogenically separated from the hydrogen by liquefaction or scrubbing with liquid methane and the carbon monoxide and methane are subsequently separated from each other by distillation. The presence of relatively high levels of methane in the synthesis gas obtained from the primary or secondary reformer is not important since the methane is removed during the cryogenic separation step. The use of cryogenic distillation, of course, is an extremely expensive process for providing a high purity source of carbon monoxide.

It is also known to add oxygen to the feed stream into the reformer used to provide carbon monoxide and hydrogen from a hydrocarbon feed stock. U.S. Pat. No. 2,701,757 to Riblett, for example, indicates that if the oxygen to carbon ratio is varied a methane content in the effluent stream of from 0.5 to 5% can be obtained. A level of methane of 0.5%, however, is still tho high to provide a high purity carbon monoxide product. U.S. Pat. No. 4,891,950 to Seufert describes a means for controlling a synthesis gas process wherein oxygen and natural gas are fed to a synthesis gas generator. The Seufert patent utilizes methane sensing means and pressure sensing means connected to the conduit containing separated carbon monoxide for use in the control system. The Seufert patent does not indicate what the methane level is of the carbon monoxide product that is obtained.

U.S. Pat. No. 2,700,598 to Odell describes a process for producing synthesis gas whereby the uniformity of the temperature distribution within a primary reaction zone is obtained. In the method of the Odell patent, hydrocarbons and steam are introduced into one end of a vertically packed column and are passed longitudinally through an annular space in the column where primary reforming of the hydrocarbons takes place. The hydrocarbons are then passed from the bottom annular space into and through a centrally and axially disposed inner tube within the column. Oxygen, air, steam or a mixture thereof may be introduced into the hydrocarbons as they pass from the annular space in the column into the inner tube.

U.S. Pat. No. 4,854,943 to Voeste, et al. describes a process of producing a gas which is rich in carbon monoxide by catalytic cracking of gaseous or vaporized hydrocarbons. A carbon monoxide product gas is obtained without formation of soot even though water vapor is not added or is not added in a substantial amount. The method of the Voeste patent utilizes an oxygen-containing gas which is introduced to the combustion zone where the hydrocarbons are reformed. The oxygen-containing gas is added to the combustion zone at a rate which corresponds to twice to ten times the stoichiometric oxygen demand required for the reaction. The method of the Voeste, et al. patent produces a reformed product having less than about 0.3% methane in the reaction product. While this level of methane is lower than is obtained by many synthesis gas reforming processes, the level is still not low enough to provide a high purity carbon monoxide product. In addition, the levels of oxygen required in the Voeste, et al. patent make the process undesirable from an economic standpoint.

U.S. Pat. No. 3,120,431 to Carton, et al. describes a method for producing synthesis gas wherein the temperature of the catalyst tube walls are maintained at a substantially constant value throughout the height of the heating furnace. In the method of the Carton, et al. patent a mixture of hydrocarbons and an oxidizing gas, selected from steam and carbon dioxide, are caused to flow upwardly inside a plurality of vertical tubes over a catalyst for the reforming reaction. Fuel is burned at several successive levels near the tubes to form a stream of hot combustion gases flowing around the tubes in the same direction as the feed stock mixture passing over the catalyst. An indirect heat-exchange relationship with the feed stock to reform the feed stock is obtained. The method also involves adjusting the heat inputs of the combustion gas for maintaining the temperature of the outside surface of the tubes at a substantially constant value over the entire length of the tubes in which the catalytic reforming is being executed.

PCT Application WO 87/06221 to Egglestone describes a method and apparatus for the production of synthesis gas utilizing primary and secondary reforming which utilizes the available heat of the effluent from the secondary reformer to provide heat for the primary reformer. The process includes the steps of (a) feeding hydrocarbon-containing gas and steam to a primary reforming zone containing a primary steam reforming catalyst under reforming conditions wherein the hydrocarbon gas is partially reformed to produce a primary reformer effluent, (b) feeding the primary reformer effluent and oxygen-containing gas to a secondary reforming zone containing secondary reforming catalyst under reforming conditions wherein a secondary reformer effluent is produced, (c) passing the secondary reformer effluent to the primary reforming zone as indirect heating medium, and (d) removing the secondary reforming effluent from the primary reforming zone and recovering the raw synthesis gas. There is no teaching in the Egglestone patent, however, of the use of high levels of import gas to provide high purity carbon monoxide product without the need for cryogenic separation.

Accordingly, it is a principal object of the present invention to provide a method for the manufacture of high purity carbon monoxide.

It is another object of the present invention to provide a method for producing high purity carbon monoxide which does not require cryogenic purification processes for hydrocarbon contaminants.

It is a further object of the present invention to provide a method for producing high purity carbon monoxide by an efficient continuous process which converts substantially all of the hydrocarbon feed to carbon monoxide, carbon dioxide and hydrogen without leaving any substantial residue of hydrocarbon impurity.

These and other objects will become more apparent from the following description and the accompanying claims.

SUMMARY OF THE INVENTION

The present invention is directed to a method for producing high purity carbon monoxide by the synthesis gas process. In the method, a hydrocarbon feed stock, carbon dioxide and steam are introduced into a primary reformer. The carbon dioxide is provided from the recycle carbon dioxide produced by the synthesis gas reactions plus an additional amount of carbon dioxide imported from outside the reaction process which is referred to herein as "import carbon dioxide". The primary reformer comprises a plurality of tubes containing a catalyst and the hydrocarbon feed stock is passed through the tubes while being heated to a temperature sufficient to reform the feed stock into a first carbon monoxide rich reaction product. The first reaction product and oxygen are fed into a secondary reformer. The secondary reformer is a reaction vessel containing a catalyst for a second reforming reaction. The first reaction product is reacted in the secondary reformer in an autothermal reaction to provide a second carbon monoxide reaction product having a hydrocarbon level that is substantially lower than the first reaction product. The second reaction product is removed from the secondary reformer at a second predetermined temperature. The second reaction product is then processed through subsequent non-cryogenic purification steps to produce carbon monoxide having very low levels of impurities without requiring cryogenic separation techniques.

DETAILED DESCRIPTION OF THE INVENTION

The present invention is directed to producing high purity carbon monoxide from a hydrocarbon feed stock. By the term "high purity carbon monoxide" as used herein is meant a carbon monoxide product having less than about 150 ppmv of hydrocarbon impurity and less than about 500 ppmv of hydrogen impurity. The hydrocarbon used in the process is preferably a gaseous hydrocarbon such as natural gas, although it is also possible to use vaporized hydrocarbons, such as propane or naphtha. The hydrocarbon to be reformed is combined with steam and carbon dioxide to provide a feed stock for introduction into a primary reformer. Import carbon dioxide and recycle carbon dioxide, as explained more fully hereinbelow, are also introduced into the primary reformer. Recovered hydrogen may also be introduced into the primary reactor for use as a fuel.

The primary reformer may be any suitable type previously used to reform hydrocarbons into carbon monoxide and hydrogen, such as the reformer described in U.S. Pat. No. 3,120,431 to Carton, et al. The primary reformer comprises a series of tubes containing a catalyst for the synthesis gas reaction. The feed stock is fed through the series of tubes which are surrounded by a casing in which a suitable fuel is burned. If the hydrogen produced in the synthesis gas reaction is not required for commercial use the hydrogen may be recycled and used as a fuel in the primary reformer. Natural gas is another suitable fuel for use in heating the primary reformer.

The pressure on the feed stock in the primary reformer is preferably from about 50 to about 200 psig. However, lower pressures down to ambient can be used and actually favor the reaction but require higher power demands during carbon monoxide purification. The feed stock is heated to a temperature in the range of from about 950° F. to about 1050° F. prior to being introduced into the primary reformer. During passage through the primary reformer, the feed stock is heated to a temperature in the range of from about 1400° F. to about 1700° F. by firing fuel, such as hydrogen or natural gas.

A first carbon monoxide product is produced during passage of the feed stock through the primary reformer. The first carbon monoxide reaction product obtained from the primary reformer still has a significantly high level of from about 0.1 to about 1.0 volume percent of methane, dry basis.

The first carbon monoxide reaction product is then immediately fed into a secondary reformer before any substantial cooling of the first carbon monoxide reaction product takes place. Oxygen is also introduced into the secondary reformer. Additional carbon dioxide, other than is contained in the first carbon monoxide reaction product, may also be introduced into the secondary reformer. Such additional carbon dioxide is usually mixed with the oxygen prior to being introduced into the secondary reformer. The oxygen, carbon dioxide and the first carbon monoxide reaction product are continuously fed into the secondary reformer. The oxygen feed rate is at a level of from about 0.1 mole to about 0.2 moles, dry basis, per mole of carbon monoxide produced. The added carbon dioxide feed rate into the secondary reformer is from 1 to about 10 times the oxygen feed rate, by volume. The carbon dioxide feed rate is preferably about 4 times the oxygen feed rate to provide a mixed oxygen/carbon dioxide feed that provides an oxygen concentration substantially equivalent to that of air.

The catalyst used in the secondary reformer can be the same basic type as the catalyst used in the primary reformer, such as nickel impregnated on a ceramic base. At the temperature of introduction into the secondary reformer, i.e., at a temperature of from about 1450° F. to about 1700° F., an autothermal reaction takes place between the first carbon monoxide reaction product and the oxygen and carbon dioxide. A second carbon monoxide reaction product having a very low level of §methane is obtained after passage of the first carbon monoxide reaction product through the secondary reformer. The second carbon monoxide reaction product obtained from the secondary reformer has from about 10 to about 50 ppmv of methane impurity, dry basis. The autothermal reaction in the secondary reformer raises the temperature of the feed stock. This temperature is controlled to be within the range of from about 1750° F. to about 1950° F. The pressure in the secondary reformer is preferably in the range of from about 50 psig to about 250 psig.

The second carbon monoxide reaction product of the secondary reformer is then cooled in process cooling apparatus and treated by suitable means to remove the carbon dioxide. Such means are well known and include countercurrent scrubbing in a column using an amine solution. The carbon dioxide obtained from the $CO_2$ scrubber is compressed in compressor and recycled to the primary reformer. Some of the $CO_2$ may be mixed with oxygen and introduced into the secondary reformer.

It is an important aspect of the present invention that import carbon dioxide is added to the reaction system at a level sufficient to reduce the hydrocarbon content of the secondary reformer effluent to less than about 50 ppm. It has been determined that the level of carbon dioxide that is imported into the reaction system should be from about 0.5 moles to about 0.7 moles of carbon dioxide per mole of carbon monoxide produced. This high level of use of import carbon dioxide means that more than about half of the carbon monoxide produced is produced from the import carbon dioxide. The use of such high levels of import carbon dioxide also results in producing very low hydrogen to carbon monoxide molar ratios in the secondary reformer effluent of from about 0.3:1 to about 0.65:1.

The molar ratio of hydrogen to oxygen produced without any import carbon dioxide is about 3:1. Carbon dioxide import has been used to produce a molar ratio of hydrogen to carbon monoxide of about 2:1 for use of the synthesis gas to produce chemicals, such as methanol and of about 1:1 for use in producing oxoalcohols. The very high levels of import carbon dioxide used in the process of the invention, resulting in molar ratios of hydrogen to carbon monoxide of about 0.3:1 to about 0.65:1 are a novel aspect of the present invention and have not previously been used for any purpose.

After separation of carbon dioxide from the second carbon monoxide reaction product, the carbon monoxide rich reaction product, which contains approximately twice as much carbon monoxide as hydrogen, is compressed and is separated into carbon monoxide and hydrogen components by a suitable method, such as a membrane separation process or a molecular sieve or an absorption process.

The process of the present invention for producing a high purity carbon monoxide product is extremely flexible in that the temperature of the second carbon monoxide product exiting from the secondary reformer can be controlled by the level of oxygen that is introduced into the secondary reformer and the temperature of the carbon monoxide reaction product exiting from the primary reformer can be controlled by fuel burned in the combustion zone of the primary reformer.

The high purity carbon monoxide product obtained after separation of hydrogen generally has the following components as set forth below in Table 1.

TABLE 1

| Component | Volume Percent/ Dry Basis |
|---|---|
| CO purity, vol pct min (inert free) | 99.95–99.9 |
| Impurities, ppmv max | |
| Methane ($CH_4$) | 30–150 |
| Hydrogen ($H_2$) | 450–500 |
| Carbon Dioxide ($CO_2$) | 4–5 |
| Water Vapor ($H_2O$) | 0.1–1 |
| Inerts ($N_2$ + Ar) | matl bal |

The impurities are reduced to specification level of the high purity carbon monoxide product of the invention by use of the following process purification steps.

| Impurity Removed | Purification Step |
|---|---|
| Methane | Reforming; $CO_2$ Import |
| Hydrogen | Membrane separation |
| Carbon Dioxide | Amine Absorption; Membrane separation |
| Water Vapor | Membrane separation |
| Nitrogen and Argon | Not separated |

Other process steps are also used to support the purification steps listed above. These support steps include: desulfurization; process gas cooling; compression; heat recovery and steam generation. Methane is removed from the process gas by the following steps.
(1) Primary Reforming
(2) Secondary Reforming (with oxygen)
(3) $CO_2$ Import The primary reforming step is based on conventional steam-methane reforming technology, utilizing a furnace with packed catalyst tubes. Steam-hydrocarbon reforming is commonly employed in ammonia plants, hydrogen plants and synthesis gas plants to reduce the methane in the process gas. This step is used in the CO process described herein to remove most of the methane present in the gas, by means and for reasons described more fully hereafter.

In the secondary reforming step, oxygen is injected to a refractory lined catalyst vessel, along with effluent gas from the primary reforming step just described. The resulting combustion reaction raises the gas temperature, and reduces the methane concentration in the gas to a low level.

Secondary reforming with oxygen is often referred to as "oxygen reforming" to distinguish it from secondary reforming with air. Oxygen reforming is much less common than reforming with air, but is still considered conventional.

In the process of the invention, oxygen reforming in combination with high $CO_2$ import achieves the final methane purification. This is a key feature of the process of the invention.

A major reason why oxygen reforming has not previously been used for final methane purification in synthesis gas processes, is because oxygen reforming by itself is insufficient to achieve the extremely low methane specification required for high purity carbon monoxide. This condition has not undergone serious scrutiny in the industry, because final methane purification for production of high purity carbon monoxide is readily attained through a subsequent cryogenic separation step present in such processes. The cryogenic step actually exists to separate CO from $H_2$, but final methane separation is attained as an important and necessary side benefit.

Accordingly, before the cryogenic step can be eliminated, a suitable means of final methane removal must be provided. As stated previously, an oxygen reforming step has previously been insufficient.

In the novel process of the invention, oxygen reforming is made sufficient by the additional step of importing carbon dioxide into the reaction system. Such import carbon dioxide ultimately reaches the secondary reformer. When $CO_2$ is present in the secondary oxygen reformer, the $CO_2$ converts the remaining methane to CO by the following overall chemical reaction:

$$CH_4 + CO_2 = 2CO + 2H_2$$

This reaction is a combination of the primary reforming reaction:

$$CH_4 + H_2O = CO + 3H_2$$

and the reverse shift reaction:

$$CO_2 + H_2 = CO + H_2O$$

In the novel process, sufficient $CO_2$ is imported into the process and subsequently into the secondary reformer to reduce the $CH_4$ in the secondary reformer effluent to the level required to meet the high purity CO specification of less than about 150 ppm.

The use of imported $CO_2$ to achieve this goal is not obvious to one skilled in the art. This is especially true since $CO_2$ is often imported into synthesis gas plants for the purpose of increasing the CO yield in such plants. This is achieved by the reverse shift reaction set forth above. Accordingly, the importation of $CO_2$ will ordinarily be interpreted by one skilled in the art as merely a means of increasing the CO yield. While this is also true for the process of the present invention, it is not the reason for use of import $CO_2$ and the level of use of import carbon dioxide in the process of the present invention is higher than previously known for use in synthesis gas plants. The underlying and novel concept is to use high levels of import $CO_2$ as a means of enhancing the oxygen reforming step to achieve the final methane removal; a concept which has been overlooked by practitioners skilled in the art.

An added feature of the process of the invention is that due to the high levels of use of import $CO_2$, almost all of the hydrocarbon feed is reacted in the primary reformer and the residual methane in the primary effluent gas is correspondingly reduced to a lower level than in other prior art processes. Accordingly, although the secondary reformer is required to further reduce the residual methane to the extremely low level of less than about 50 ppmv in the secondary reformer effluent gas, the absolute quantity of methane that is required to be removed by the secondary reformer is less than in other processes. This in turn significantly reduces the oxygen requirement which in turn leads to relatively mild conditions in the secondary reformer.

An important feature of the process is that the oxygen is preferably mixed with carbon dioxide prior to entry into the secondary reformer. The $CO_2$ rate is controlled such that the oxygen concentration in the mixture is essentially the same as the oxygen concentration in air. Because the oxygen is diluted in this manner, the characteristics of the mixture, especially that related to combustion, will be similar to that of air. This permits use of a conventional air burner design and gives a lower localized flame temperature and corresponding less severe operation than obtained in a typical oxygen reformer.

The purification steps required for the other impurities will now be considered by way of example.

The effluent gas from the secondary reformer is cooled, and then passes through an inhibited monoethanolamine (MEA) scrubbing system for bulk removal of carbon dioxide. The use of MEA for bulk $CO_2$ removal is conventional technology. MEA is selected because of its high affinity for $CO_2$, although other solvents could conceivably be used and the specific selection of MEA is not necessarily a requirement for the viability of the process.

The gas from the MEA unit is then compressed and passed through a membrane system.

Membranes are commonly accepted technology for gas separations. Membranes consist of pipe-like cylinders of a semi-permeable material such as polysulfone or cellulose acetate. Some gases (such as $H_2$, $H_2O$ and $CO_2$) have characteristics that enable them to more readily pass through (permeate) the membrane walls. Other gases, such as CO, are less permeable and remain the bulk gas stream within the membrane cylinder. The $H_2$, $H_2O$ and residual $CO_2$ are removed from the CO stream by penetration through a membrane wall in this manner.

Although $H_2$-containing streams are often separated by membranes, the hydrogen is ordinarily not an impurity, but is instead the main component in the gas stream. In such cases, the object is to remove impurities from the hydrogen. However, the same principle can be used to separate hydrogen as an impurity from the remainder of a bulk CO stream.

An important feature of the process of the invention is that membranes are used to reduce the hydrogen impurity to an extremely low level of less than about 500 ppmv required to meet the high purity CO product specification, especially since the membrane feed is relatively high in hydrogen. Membranes have not previously been used commercially to achieve such a low hydrogen level on any feed stock.

In $H_2$/CO plants utilizing cryogenic separation, $H_2O$ vapor and residual $CO_2$ are typically removed by molecular sieve units. Such units are used to achieve an extremely low residual $H_2O$ vapor and $CO_2$ level to avoid subsequent and unacceptable freezing of these components in the downstream cryogenic system.

A special feature of the process of the invention is that the $H_2O$ vapor and residual $CO_2$ are removed by the membrane system to a level acceptable for final high purity CO product specifications, concurrently with the hydrogen removal, without the need for a separate molecular sieve unit.

The use of a single membrane system for simultaneous removal of the $H_2$, $H_2O$ vapor, and residual $CO_2$ impurities is considered a very advantageous and unique feature of the process of the invention.

In addition, although both the process of the invention and the cryogenic process use compression ahead of final CO purification, the process of the invention maintains the product CO at relatively high pressure (300 to 400 psig). On the other hand, the CO product from the cryogenic process is typically available at much lower pressures, and requires recompression to final product pressure.

Nitrogen is not readily removable from CO by any known commercially viable process, including cryogenic processing. Accordingly, any nitrogen in the hydrogen feed stock will end up in the CO product and some nitrogen is often present in the hydrocarbon feed stock. Nevertheless, the process of the invention still enjoys an advantage over the cryogenic process in this respect, since there will be a significantly lower percentage of $N_2$ in the CO product. This occurs because the $CO_2$ import in the primary and secondary reformers results in more CO made per unit of $N_2$-containing feed stock. Accordingly, the percent $N_2$ in the CO product is typically only about half as much as in typical cryogenic CO product.

The high purity CO product of the invention also contains about 0.05 to about 0.07 mol % of argon from the argon initially present in the oxygen feed to the secondary reformer. This argon is combined with the nitrogen to form the "inerts" component of the CO product specification set forth above.

In operation of a plant utilizing the novel process of the invention, the following steps are typically performed.

Desulfurization—The feed is preheated to 750° F., and sent to the desulfurizer, where the sulfur compounds are removed.

Steam Reforming—The desulfurized gas is mixed with steam and carbon dioxide, and superheated to 950° F. The feed mixture then passes through catalyst filled tubes in the primary reformer. In the presence of nickel catalyst, the feed reacts with steam to produce hydrogen and carbon monoxide by the following reaction:

$$CH_4 + H_2O + \text{heat} = CO + 3H_2$$

Excess carbon dioxide in the feed (import plus recycle), produces additional carbon monoxide by the following reaction:

$$CO_2 + H_2 + \text{heat} = CO + H_2O$$

The first reaction is the reforming reaction, and the second is the reverse shift reaction. Both reactions produce carbon monoxide. Both reactions are limited by thermodynamic equilibrium. Both reactions are endothermic.

These reactions take place under carefully controlled external firing of $H_2$-rich offgas from the Carbon Monoxide Purification System, supplemented by natural gas as needed.

Import $CO_2$—Import $CO_2$ is added to the system, preferably by adding the import $CO_2$ to the recycle $CO_2$ at a level of from about 0.5 to about 0.7 moles of import $CO_2$ per mole of CO produced.

Oxygen Reforming—The steam reformer effluent which is now at 1600° F. is further reformed with oxygen in the secondary oxygen reformer. The oxygen is added to the secondary reformer at a level of from about 0.1 to about 0.2 moles of oxygen per mole of carbon dioxide produced. Carbon dioxide is added to the oxygen to limit the oxygen content to 20 mole percent of the total oxidant stream. The secondary reformer contains conventional nickel catalyst. The combustion reaction reduces the residual methane to the desired level. The process gas exit conditions from secondary reformer are 1900° F. and 100 psig.

Process Gas Cooling—The process gas is cooled to 800° F. in a steam generator and is further cooled to 110° F. in a process gas cooler. Condensate is separated from the cooled stream and the gas is sent to the $CO_2$ Removal System.

$CO_2$ Removal and Recycle—The process gas is fed to the $CO_2$ absorber at 110° F. and 85 psig. The $CO_2$ is absorbed by the amine solution. The product gas containing less than 25 ppmv $CO_2$ is sent to the product gas compressor.

The $CO_2$ from the amine system is mixed with import $CO_2$ from off plot and is compressed to 150 psig in a lubricated screw compressor. The compressed $CO_2$ is then sent to the reformers.

Product Gas Compression—The product gas, containing essentially hydrogen and carbon monoxide, is mixed with a recycle stream from the carbon monoxide purification system and is compressed in a lubricated screw compressor to about 350 psig, and sent to the membrane separation system.

Carbon Monoxide Purification—The carbon monoxide is purified using a two-stage membrane system. The permeate from the first stage is sent to the steam reformer as fuel or is recovered as hydrogen. The permeate from the second stage is compressed in the compressor and sent back to the membrane system. The CO product is sent offplot at 110° F. and 320 psig.

Heat Recovery and Steam Generation—The thermal efficiency of the plant is optimized by recovery of heat from the reformer flue gas stream and the effluent process gas stream. This energy is utilized to generate steam for reforming and for amine reboiling. The plant is in steam balance, thereby requiring no import steam.

The carbon monoxide product obtained from the process of the present invention is suitable for use in high purity carbon monoxide processes without further treatment. There is no need to use expensive cryogenic distillation techniques to remove the very low levels of methane remaining in the carbon monoxide product.

While the present invention has been described in detail and by way of example, it is anticipated that variations of the described invention may be made without departing from the invention and the scope of the appended claims.

What is claimed is:

1. A method for producing high purity carbon monoxide comprising providing a reaction system including a primary reformer and a secondary reformer, introducing a hydrocarbon feed stock and import carbon dioxide into said reaction system, said import carbon dioxide being introduced at a level of from about 0.5 moles to about 0.7 moles per mole of high purity carbon monoxide produced, passing said feed stock and import carbon dioxide into said primary reformer, heating said feed stock as it passes through said primary reformer to a temperature sufficient to reform said feed stock into a first carbon monoxide reaction product, removing said first reaction product from said primary reformer, introducing said first reaction product and oxygen into a secondary reformer, reacting said first reaction product in said secondary reformer in an autothermal reaction to provide a second carbon monoxide reaction product having a hydrocarbon level of less than about 50 ppmv and a molar ratio of hydrogen to carbon monoxide of from about 0.3:1 to about 0.65:1, removing said second reaction product from said secondary reformer, separating carbon dioxide from said second reaction product to provide a recycle carbon dioxide stream and a carbon monoxide and hydrogen stream, introducing said recycle carbon dioxide stream along with said import carbon dioxide and said feed stock to said primary reformer, and separating hydrogen from said second carbon monoxide and hydrogen stream to provide a high purity carbon monoxide product having from about 99.95 to about 99.9 volume percent carbon monoxide, less than about 150 ppmv of hydrocarbon and less than about 500 ppmv of hydrogen without the use of cryogenic separation techniques.

2. A method in accordance with claim 1 wherein said temperature in said primary reformer is from about 1750° F. to about 1950° F.

3. A method in accordance with claim 1 wherein said autothermal temperature in said secondary reformer is from about 1750° F. to about 1950° F.

4. A method in accordance with claim 1 wherein said secondary reformer is operated at a pressure of from about 50 to about 200 psig.

5. A method in accordance with claim 1 wherein a portion of carbon dioxide from said recycle carbon dioxide or said import carbon dioxide is mixed with said oxygen prior to introducing said oxygen into said secondary reformer.

6. A method in accordance with claim 5 wherein the ratio of carbon dioxide to oxygen is from about 1:1 to about 10:1 by volume.

7. A method in accordance with claim 6 wherein the ratio of carbon dioxide to oxygen is about 4:1 by volume.

8. A method in accordance with claim 1 wherein said oxygen is introduced into said secondary reformer at a level of from about 0.1 mole to about 0.2 mole per mole of high purity carbon monoxide.

9. A method in accordance with claim 1 wherein said hydrocarbon feed stock is natural gas.

10. A method in accordance with claim 1 wherein the level of methane in said second carbon monoxide reaction product is from about 10 ppmv to about 50 ppmv.

11. A method in accordance with claim 1 wherein said high purity carbon monoxide is recovered from said carbon monoxide stream by membrane separation.

* * * * *